(12) United States Patent
Tamatsu

(10) Patent No.: US 6,584,555 B2
(45) Date of Patent: Jun. 24, 2003

(54) INFORMATION STORAGE AND RETRIEVAL SYSTEM

(75) Inventor: Masaharu Tamatsu, Hachioji (JP)

(73) Assignee: Annex Systems Incorporated, Tokyo (JP)

( * ) Notice: Subject to any disclaimer, the term of this patent is extended or adjusted under 35 U.S.C. 154(b) by 0 days.

(21) Appl. No.: 10/119,145

(22) Filed: Apr. 10, 2002

(65) Prior Publication Data

US 2002/0133686 A1 Sep. 19, 2002

Related U.S. Application Data

(63) Continuation of application No. 09/254,437, filed on May 7, 1999, now Pat. No. 6,415,375.

(30) Foreign Application Priority Data

Jul. 11, 1997 (JP) .............................................. 9-219700

(51) Int. Cl.$^7$ .............................................. G06F 12/10
(52) U.S. Cl. ........................ 711/202; 711/170; 711/171; 711/172; 711/173; 711/200; 711/201; 711/206
(58) Field of Search ................. 711/170–173, 200–202, 711/205–207

(56) References Cited

U.S. PATENT DOCUMENTS 5,809,516 A * 9/1998 Ukai et al. .................. 711/113
6,212,647 B1 * 4/2001 Sims et al. .................. 711/112
6,226,728 B1 * 5/2001 See et al. .................... 711/103
6,401,160 B1 * 6/2002 See et al. .................... 711/103

* cited by examiner

Primary Examiner—T. V. Nguyen
(74) Attorney, Agent, or Firm—Apex Juris, PLLC; Track M Heims

(57) ABSTRACT

Conventional information storage systems are subject to numerous practical constraints such as contiguity in the physical locations of blocks and the requirement that storage blocks be created in advance. Information retrieval in these systems has required the creation of indices, which take a long time to generate, and the structure of these systems makes them prone to deadlock since the indices are updated and the range of exclusion broadened when the referent information is modified. This invention utilizes the random access facilities of semiconductors to achieve high speeds and minimize the maintenance load. This invention introduces location tables and alternate-key tables to replace these indices. It also stores multiple records in a single block and can handle variable-length records and spanned records. The location tables manage the storage blocks. An alternate-key block is made up of a substitute key and its block number and the primary key value, either of which may be used to retrieve a target record by searching this table. Binary search is a well-known high-speed method of querying tables, but other methods may be used as well.

4 Claims, 7 Drawing Sheets

Block

| Block No. | Primary | | Overflow | | Record 1 | | | Record 2 | | | Overflow block address |
|---|---|---|---|---|---|---|---|---|---|---|---|
| | From | To | From | To | Prm key | Alt key | | Prm key | Alt key | | |

Figure 1

Location Table

| Block No. | Physical Address |
|---|---|
| ← 8 bytes → | ← 8 bytes → |
| | |
| | |

Final Pointer

| Block No. | Physical Address | Primary key |
|---|---|---|
| ← 8 bytes → | ← 8 bytes → | ← Any length → <br> (Maximum key value in final block) |

Sub-range Location Table

| Sub-Range No. | Sub-range Block No. | Physical Address |
|---|---|---|
| ← n bytes → | ← (8 − n) bytes → | ← 8 bytes → |
| | | |
| | | |

Sub-range Final Pointer

| Sub-range No. | Sub-range Block No. | Primary Key |
|---|---|---|
| ← n bytes → | ← (8 − n) bytes → | ← Any length → <br> (Maximum key value in final block) |
| ← n bytes → | ← (8 − n) bytes → | ← Any length → <br> (Maximum key value in final block) |
| | | |

Figure 3

Alternate Key Entry

| Alt Key | Block No. | Primary Key |
|---|---|---|
| ← Any length → | ← 8 bytes → | ← Any length → |
| | | |

Alternate Key Block

| Block No. | Primary | | Overflow | | Alternate key entry-1 | Alternate key entry-2 | Overflow alternate key block address |
|---|---|---|---|---|---|---|---|
| | From | To | From | To | | | |

Figure 4

Block

| Block No. | Primary | | Overflow | | Record 1 | | | Record 2 | | | Overflow block address |
|---|---|---|---|---|---|---|---|---|---|---|---|
| | From | To | From | To | Prm key | Alt key | | Prm key | Alt key | | |

Figure 6

| Primary Block 0 | |
|---|---|
| Primary Block 1 | |
| Primary Block 2 | |
| Primary Block 3 | |
| Primary Block 4 | Overflow Block 4 - 0 |
| Primary Block 5 | |
| Primary Block 6 | |
| Primary Block 7 | |
| Primary Block 8 | Overflow Block 8 - 0 |
| Primary Block 9 | Overflow Block 9 - 0 |
| Primary Block 10 | |
| Primary Block 11 | |
| Primary Block 12 | |
| Primary Block 13 | |
| Primary Block 14 | |

Figure 7

Text Data Keys

0001　　I go to school today.
　　　　①②③　④　　⑤

0002　　I will relax at home tommorow.
　　　　⑥ ⑦　⑧　⑨　⑩　⑪

The primary keys are 0001 and 0002. All keys are stored in block 155.

| Alternate key value | Pointer (Primary key value, Block No., Displacement of key) |
|---|---|
| relax | 0002, 155, 7 |
| home | 0002, 155, 16 |
| school | 0001, 155, 8 |
| at | 0002, 155, 13 |
| go | 0001, 155, 2 |
| today | 0001, 155, 15 |
| will | 0002, 155, 2 |
| I | 0001, 155, 0 |
| tmmorow | 0002, 155, 21 |
| to | 0001, 155, 5 |
| I | 0002, 155, 0 |

INFORMATION STORAGE AND RETRIEVAL SYSTEM

This application is a continuation of Ser. No. 09/254,437 filed May 7, 1999 now U.S. Pat. No. 6,415,375.

BACKGROUND OF THE INVENTION

1. Field of the Invention

The invention relates to the field of information storage and retrieval, and particularly to the storage and reading of data with computers and also particularly to data management in that it provides data storage and retrieval at high speeds, high ratios of data to storage capacity and greatly reduced maintenance time.

2. Description of Related Art

Conventional information storage systems are subject to numerous practical constraints such as contiguity in the physical location of blocks and the requirement that storage blocks be created in advance. Moreover, in most systems random access requires the creation of indices, which take a long time to generate, and the structure of these systems makes them prone to deadlock since the indices are updated and the range of exclusion broadened when the referent information is modified. Although direct access systems do not use indices, these systems relate record keys with storage locations by means of special programs known as randomizing routines. In practice they do not allow for sequential access and exhibit low storage efficiency when compared with methods that use indices.

SUMMARY OF THE INVENTION

Since conventional information storage and retrieval systems presumed their data would be stored on magnetic disk, in certain respects their shortcomings are unavoidable. On the other hand, the price of semiconductors has fallen remarkably and conditions for using semiconductors as memory devices are falling into place. Semiconductors do not necessitate physical movement or rotation and enable high-speed storage and reading even if addresses are not contiguous. The construction of a memory device taking advantage of these properties and comprising semiconductors alone or semiconductors and random access memory media would enable high-speed storage and retrieval processing. A semiconductor may be used as the primary memory device or may be provided to the invention as an external memory device. Storing information sequentially in blocks, using overflow blocks for storage when the insertion of information causes an overflow, using location tables or alternate-key blocks that manage storage blocks rather than using indices, and performing retrievals from these location tables or alternate-key blocks enables high-speed storage and reading, improves the efficiency of information storage and minimizes the occurrence of deadlock.

Location tables and alternate-key tables are introduced in place of indices. Records are not stored independently; rather, multiple records are stored in a single block. FIG. 4 illustrates the structure of a block. The FROM and TO segments in FIG. 4 represent the minimum key value and maximum key value of the block, respectively, but neither is absolutely necessary and the invention may be implemented with either one alone. When using long records, a single record may be matched to a single block, and a format in which a single record is stored over two or more blocks (spanned records) is also possible. All primary blocks in a single file and all overflow blocks in a single file are of equal lengths, facilitating region management. Storage in blocks allows block detection by means of fixed-length operations even when variable-length records are stored because the block units are of a fixed length. The location table secures the required contiguous region in advance. A single record (entry) in a location table manages a single primary block in the data record storage region. Although it is also possible to implement methods of managing multiple primary blocks, since primary blocks may be of any given size it is simpler not to manage multiple blocks if the implementation allows modification of the size of blocks. Blocks are classified into primary blocks and overflow blocks, and only the primary blocks are managed in the location table. Records are stored first of all in primary blocks. If storage in a block is rendered impossible due to insertion of a record, a single overflow block is allocated to that block. If that overflow block is not sufficient for storage, one more overflow block is allocated. Overflow blocks are managed as dependent blocks of their primary block; they are not managed in the location table but only by pointing from the primary block.

Since overflow blocks are not managed in the location table, records are not inserted into the location table, the time it takes to re-write the location table is minimized and re-writing of the location table is a single record. Therefore, the range of any exclusion that may occur is radically minimized and the possibility of a deadlock is greatly reduced.

A deadlock occurs when two different tasks on a single computer perform exclusion operations on two or more identical resources in different sequences but does not occur if the sequence of exclusion is identical, and narrower ranges of exclusion reduce the probability of deadlock. Conventional indices are made up of multiple levels. When a record is accessed and a record's key is modified when an index is updated, the index is also modified. When this affects the lowest-level index alone, the exclusion range is restricted, but in some cases this may affect higher-level indices. Since exclusion affects a range of multiple records and it takes a great deal of time to update the indices in such cases, exclusion takes up long periods of time and is a cause of multiple instances of deadlock.

OBJECTS AND ADVANTAGES

Accordingly, several objects and advantages of the invention are:

(a) To provide high-speed random access by using primary keys and alternate keys;

(b) To provide high-speed sequential read and write operations;

(c) To provide minimal modification caused by updating, modification and deletion of data, short processing time, and high-speed storage by using location tables and alternate-key blocks instead of indices;

(d) To provide creation (generation) of location tables and alternate-key blocks in shorter times than are required for the creation of indices;

(e) To eliminate the necessity of creating blocks in advance;

(f) To provide the ability to add blocks until no physical space remains on a storage medium;

(g) To provide record-compression capabilities deriving from the capability of handling variable-length records and record insertion (though in most cases compressed records cannot be updated);

(h) To provide the capability of using multiple alternate keys; and (i) To provide greatly reduced database maintenance time.

BRIEF DESCRIPTION OF THE DRAWINGS

FIG. 1 illustrates the structure of the location table and final pointer, used in the description of the preferred embodiment of the invention.

FIG. 3 illustrates the alternate-key table (and its entries) and the alternate-key used in the description of the preferred embodiment of the invention.

FIG. 4 illustrates the structure of the blocks used in the description of the preferred embodiment of the invention.

FIG. 6 illustrates the relationship between the blocks and overflow blocks used in the description of the preferred embodiment of the invention.

FIG. 7 describes an example of keys applied to text data in the preferred embodiment of the invention.

DESCRIPTION OF THE PREFERRED EMBODIMENTS

Records stored with this system are restricted to records having a single unique primary key and none or one or more non-unique (though these may be unique) keys (alternate keys). The system does not accommodate records that do not have a unique key.

However, a serial number or other unique key may be forcibly applied to a record not having a unique key when such a record is added and reading performed only in the physical order of records or in the order of their alternate keys. Since insertion is not thus involved, an overflow block is required only when updating a record increases the length of the record.

In the description following, "addition" refers to storage of a record having a primary key larger than the largest primary key of records currently stored, and "insertion" refers to storage of a record having a primary key smaller than the largest primary key of records currently stored.

Figure 2:
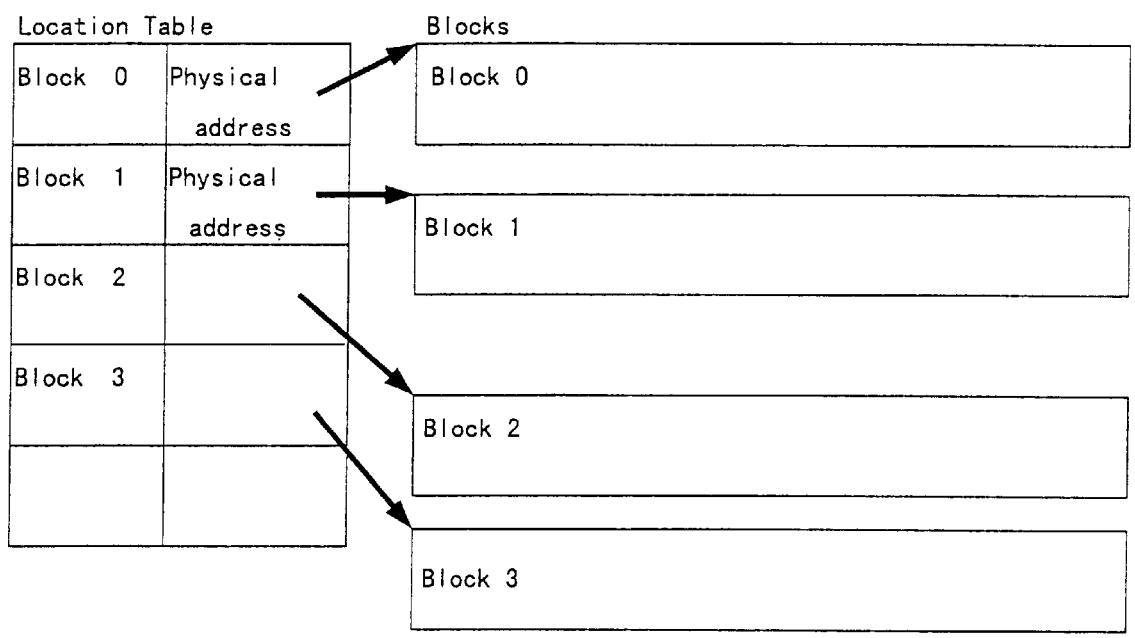
FIG. 2 illustrates the relationship between the location table and the blocks used in the description of the preferred embodiment of the invention.

First, we will describe the storage system. The size of a location table is calculated from the number of records planned to be stored, the size of their blocks, and the number of primary-key blocks per record in the location table, and a contiguous region sufficient for this size is secured in a storage medium. Similarly, the size and number of alternate-key blocks is determined and a contiguous region sufficient for this size secured so as to enable storage of entries in the number of records also storing alternate-key blocks. However, in the event storage exceeds the number originally assumed, there is a possibility that the contiguous region may fill up, making further storage impossible. In such cases, an additional contiguous storage region is secured and an address-conversion table used to treat multiple contiguous regions as though they were one contiguous region, thus allowing the system to accommodate situations in which the number of records stored exceeds the number originally assumed. When there are multiple alternate keys, a region is secured for each one. There is no need for the alternate-key blocks corresponding to different alternate keys to be contiguous. FIG. 2 illustrates the relationship between a location table and its blocks.

When using a storage system split into sub-ranges, a location table is created for each sub-range in a size suited to the number of records intended to be stored in the sub-range. Each location table must be in a contiguous region, but all location tables need not be in a single contiguous region. An alternate-key block is set up not split across regions, but in a contiguous region of a size corresponding to all records.

When storing the first record, first a final pointer is referenced in exclusion mode. The final pointer controls how far the block and location table are used and so has the format illustrated in FIG. 1. Since there are no stored records to begin with, the first block is registered in the final pointer as the final block. The block number and primary-key value are registered in the final pointer. Next, the first primary block is secured in exclusion mode, and its physical address and block number (0 in this case since numbering starts from 0) are registered. When a block is secured on disk, its entry includes the value of its primary key. Next, records are registered in that block. Then all exclusion is released.

To register the second record, first the final pointer is referenced in exclusion mode and it is determined whether the primary key is greater than the value of the key in the final pointer. First we will describe how a record is added. Since the block number is 0, block number 0 in the location table is referenced in exclusion mode, the physical location of block 0 obtained and block 0 at that physical location read. If there is sufficient space in that block, the record is stored, the value of the primary key registered in the final pointer and all exclusion released.

Subsequent additions are performed in like fashion. Sometimes the space in block 0 will not be sufficient to store an additional record. If block 0 lacks sufficient space when the above operation is performed and block 0 read on the addition of record number m, a single primary block (block number 1) is secured in exclusion mode. Record number m is then stored in block 1. The second record in the location table is then referenced in exclusion mode, and the physical location of primary block 1 registered in this record. All exclusion is then released. In this way additions are stored in the location that physically follows the last record. When split across sub-ranges, the same operations are performed for each sub-range.

Next we describe how a record is inserted. Assume that multiple location-table records, primary blocks and data records already exist.

It is first of all necessary to determine which block the record inserted should be stored in.

This is done by searching the location table. A binary search is one example of a high-speed search method. Though a binary search method is used here as an example, other methods may also be used to find a target entry. The method used here is to find dichotomous points and compare the value of the primary key of the record stored in that block (abbreviated below as "stored primary-key value"), including the overflow block if the primary block that record points to has an overflow block, with the value of the primary key of the record inserted (abbreviated below as "inserted primary-key value"). If the inserted primary-key value is greater than the smallest of the stored primary-key values of the block or blocks and smaller than the smallest of the stored primary-key values in the next block, it is stored in the first of those two blocks. Otherwise, the sizes of the stored primary-key values of that block and the insertion-block primary-key value are again compared, dichotomous points are obtained in the former if the inserted primary-key value is smaller and in the latter if the inserted primary-key value is not smaller, and like operations performed to identify the block to be used for storing the record.

If the location table is composed of multiple contiguous regions, a binary search cannot be performed as is, but using an address-conversion table to treat it as though it were a single contiguous region allows a binary search to be performed.

If the location table is split across sub-ranges, first a comparison is made with the value of either the initial or the final primary key of the location table in each sub-range to determine which sub-range holds the target record. A binary search is then performed on that sub-range in like manner as described above to identify the block that holds the target record.

If the record is to be stored in block number n, the following shall apply. The location within the block where the record is to be inserted is identified. Since records are arranged in the order of their primary keys, the location of the insertion will be that location immediately prior to the record having a primary key larger than the record being inserted. First, a check is performed for duplication of the primary keys. If there is any duplication of primary keys, an error is output since the storage cannot be performed. If there is no duplication of primary keys, one or more records located behind the record being inserted are moved rearwards to create a space exactly equal to the size of the record being inserted. If the records thus moved fit within the block, insertion is completed, but if those records do not fit within the block, a single overflow block is provided, a pointer to it provided from the primary block, and as many records stored in the overflow block as necessary. Then the record to be inserted and any that follow it are stored in the primary block. FIG. 6 illustrates the logical relationship between primary blocks and overflow blocks.

If an overflow block already exists, it is to be preferred for it to be possible to store the record combining a primary block and its overflow block. There is also a possibility that only a part of an overflow block is used and the region not used efficiently. In order to avoid such, a single overflow block may be provided for multiple primary blocks. It is also possible to provide all overflow blocks in an identical size smaller than that of their primary block. It is also possible use a single overflow block by pointing to it from multiple primary blocks.

Another method that may be adopted is to store a record that overflows in an independent storage region and provide a pointer to it from its primary block. However, if this method results in a large number of overflow records, it entails the disadvantage of long retrieval times compared with a method using overflow blocks. In practice, the storage method selected should be that suited to the number of records that are to be generated.

Next, we describe storage and updating with alternate keys. Alternate-key tables are stored in an alternate-key block in the order of their alternate keys. Entries in an alternate-key table consist of an alternate key, the physical address of the block where the record of that key value is stored, and the primary key of the record of that key value. The number of entries in an alternate-key table changes when its records are added or updated, but there is a high possibility that an increase in the number of entries will result in entry insertion and a very low possibility that such increase will result in entry addition. Therefore, the management methods used for primary keys are not appropriate. If there are already more stored records than the final number planned, insertions can be processed efficiently by providing a space of defined size when storing an entry in an alternate-key block, but if the initial number of records is less than the final number of stored records planned, key insertions will result in a multiple overflow alternate-key blocks. A pre-alternate-key block is used in such cases.

A pre-alternate-key block has the same structure as an alternate-key block, and the number of pre-alternate-key blocks is the size that can accommodate entries in the number of alternate-key blocks divided by the size of the pre-alternate-key blocks. When the number of entries in a pre-alternate-key block becomes equal to the number of alternate-key blocks, these entries are moved from the pre-alternate-key block to an alternate-key block. When such entries are moved, in principle a single entry is stored in any given alternate-key block, but entries having an identical alternate key are stored in the same alternate-key block. If the number of entries having an identical alternate key is too large to store them in the corresponding alternate-key block, they are stored in an added alternate-key overflow block.

For example, assume that the final number of stored records planned is one million records. If 100 entries can be stored in a single alternate-key block, 10,000 alternate-key blocks will be required. The entries are stored in a pre-alternate-key block until there are 10,000 of them, and when the number of entries reaches 10,000, the entries are transferred to an alternate-key block.

If there is a large number of alternate-key blocks and a single level of pre-alternate-key blocks is provided, there is a possibility that this will result in a large number of pre-alternate-key blocks, a high frequency of insertions and inefficient updating. In such cases, multiple levels of pre-alternate-key blocks are provided. Taking the example described above, 10,000 entries will be stored in a pre-alternate-key block, but this pre-alternate-key block is provided two levels since 100 entries can be stored in a single block, 100 entries are managed in the first pre-alternate-key block and when the number of entries in that first pre-alternate-key block reaches 100, they are transferred to the second-level pre-alternate-key block.

Figure 5:
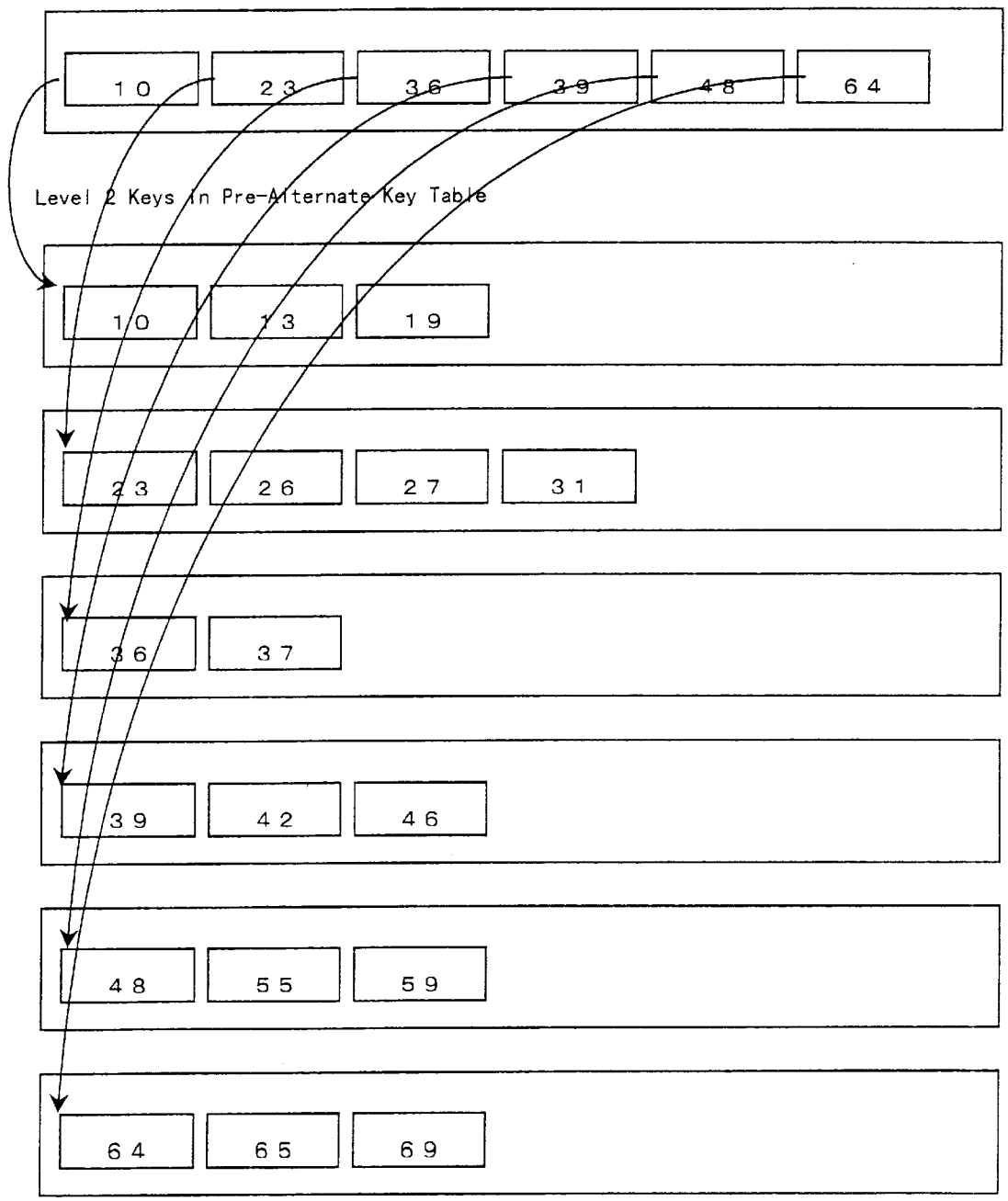
FIG. 5 illustrates the structure of the pre-alternate-key blocks used in the description of the preferred embodiment of the invention.

FIG. 5 illustrates an example of such a transfer in which a two-level pre-alternate-key block is provided.

Next, we will describe retrieval of records using primary keys. This operation is performed in the same fashion used to determine the insertion location when a record is inserted. The example of retrieval described here uses the same binary-search method used in the example described for insertion. First, dichotomous points are found in the location table, and the value of the primary key of the record stored in that block (abbreviated below as "stored primary-key value"), including the overflow block if the primary block that record points to has an overflow block, is compared with the value of the primary key of the target record (abbreviated below as "target primary-key value"). If the target primary-key value is greater than the smallest of the stored primary-key values- and smaller than the smallest of the stored primary-key values in the next block, either the target record exists in that block or the record of that key value does not exist in the file. Since records in a block are arranged in the order of their primary keys, searching the block can detect the target record or confirm whether the record does not exist in the file. Otherwise, the sizes of the stored primary-key values of that block and the primary-key value of the target record are again compared, dichotomous points are obtained in the former if the target primary-key value is smaller and in the latter if the target primary-key value is not smaller, and like operations performed to identify the block storing the record.

Next, we will describe retrieval using alternate keys. Retrieval with alternate keys is performed by searching alternate-key blocks. The binary search method is typically used, but the discussion is omitted here since it is described above with respect to retrieval using primary keys. The alternate-key block including the target alternate key is identified. Then the target alternate-key table in the alternate-key block is identified. The result is that, as when using primary keys, either the entry exists in that block or a record with that alternate-key value does not exist in the file and the entry does not exist. If the alternate-key block has any alternate-key overflow blocks, all such blocks are searched.

If the alternate-key table (or entry) having the target key value is identified, the physical block is accessed from the physical block number in that entry and the record in that block identified that matches the primary-key value in the entry. And since alternate keys may be non-unique, the next entry in the alternate-key block is examined. If it has an identical alternate-key value, the record corresponding to that entry is also retrieved, and this operation repeated until no entry has an identical key value.

Next, we will describe generation. Generation may be useful in a variety of situations, among them when multiple records already exist in this system's file and regeneration is required for such reason as an increased number of overflow blocks, when restoring information from a back-up medium to the medium on which this system has been implemented, and when moving records stored by a method other than that described here to this system. Any of these may be effected by the same means.

For regeneration, files are read in the order of their primary keys with a sequential access method and a sequential file is created. A sequential file is similarly created for generation.

Next, the location tables and alternate-key block are to be prepared. The number of location table entries is obtained by dividing the number of records planned to be stored by the number of records that can be stored in a single block, and that amount of space is secured in a contiguous region. Alternate-key blocks are secured for each type of alternate key. All alternate-key blocks for a given type of alternate key have the same size, and the number of such blocks is determined thus: The number of entries (A) that can be stored in a single alternate-key block is obtained, and the number of records planned to be stored is divided by A to obtain the number of alternate-key blocks. Pre-alternate-key blocks are also to be prepared.

Records are stored in a block in the order of their primary keys. The frequency of insertions may be estimated in advance or calculated from statistical data, and a certain proportion of empty space provided within a given block. This also allows for instantaneous storage of records. This is determined by how often insertions are to be performed. The proportion of empty space provided within a block may vary from block to block. When a record is stored, an entry is written to the location table. If a record has an alternate key, first an alternate-key entry is created from the record and stored in a sequential file. When alternate-key entries have been created for all records, the entries are sorted in the order of the alternate keys and the sorted entries stored in the alternate-key block. The number of records generated is divided by the maximum planned number of records, and storage is performed in the alternate-key block in the proportion corresponding to that quotient. This is because the alternate keys are inserted rather than added.

An alternate key may also be put to special use. Since keys are currently assigned to fields stored in a specific location in a record, they have an identical length and format, such as a product code or a customer code. Since keys and records may be made relational in this system, keys may be created for text data. Keys may also be created for records of non-specific format, as illustrated in FIG. 7. As in this example, alternate keys may be assigned to records not having fields of uniform location or fixed field lengths.

What is claimed is:

1. An information storage and retrieval system for computers, comprising:

a memory device having at least one block of memory, each block capable of storing records, each of said records having a single unique primary key and zero or more non-unique alternate keys, said alternate keys being storable in an order of said primary key;

a location table, comprising a multitude of entries, each of which controls a primary block and a physical location of that primary block, said location table controlling the physical locations of each of said blocks in said memory device, whereby a block number and the physical location in said memory device of said each primary block is determined by said entries in said location table;

wherein records are stored in each block in the order of its respective primary key, and further comprising new blocks to store records that cannot be stored in said each block;

wherein:

said each block comprises the primary block and an overflow block, the records being first stored in said primary block;

further comprising a first overflow block to said primary block when no further records can be stored in said primary block;

and further comprising further overflow blocks to said first overflow block when said first overflow block is insufficient to store the record;

whereby records are stored serially across blocks; and whereby a new primary block is provided to store additional records when said additional record cannot be stored in a final primary block.

2. An information storage and retrieval system for computers, comprising:

a memory device having at least one block of memory, each block capable of storing records, each of said records having a single unique primary key and zero or more non-unique alternate keys, said alternate keys being storable in an order of said primary key;

a location table, comprising a multitude of entries, each of which controls a primary block and a physical location of that primary block, said location table controlling the physical locations of each of said blocks in said memory device, whereby a block number and the physical location in said memory device of said each primary block is determined by said entries in said location table;

a facility for positioning each of said primary blocks without restriction on each said primary blocks' physical location;

wherein records are stored in each block in the order of its respective primary key, and further comprising new blocks to store records that cannot be stored in said each block;

wherein:

said each block comprises the primary block and an overflow block, the records being first stored in said primary block;

further comprising a first overflow block to said primary block when no further records can be stored in said primary block;

and further comprising further overflow blocks to said first overflow block when said first overflow block is insufficient to store the record;

whereby records are stored serially across blocks; and whereby a new primary block is provided to store additional records when said additional record cannot be stored in a final primary block; and wherein said each primary block can be positioned anywhere in said memory device without restriction on its location.

3. An information retrieval system for computers, comprising:

a memory storage device for storage of one or more records, each said record having a single unique primary key and zero or more non-unique alternate keys, stored in blocks of fixed length in the order of their primary keys;

one or more location tables, said location tables matching numbers assigned to said blocks with physical locations of said blocks in said memory storage device to control the locations in said memory storage device;

positioning means for positioning said blocks in said memory device with no restriction whatsoever on said blocks' physical location;

block creating means for creating individual blocks as required until a physical data storage area is full such that individual blocks need not be created in advance;

space provisioning means for the advance provision of contiguous space for said location tables of a size deemed sufficient from calculation of the number of scheduled records and size of said blocks, storage means for storing said records in excess of the number of originally scheduled said records by securing further additional said contiguous space for additional said location tables and treating multiple said contiguous spaces as a single contiguous space when said contiguous space of previously provided said locations tables becomes full and unable to store additional said records;

wherein said blocks comprise primary blocks and overflow blocks, new ones of said primary blocks are provided to store additional said records when said additional record cannot be stored in a final said primary block;

wherein:

said records are stored first in said primary blocks, said overflow block is provided to said primary block when said records already stored prevents further storage in said primary block, said overflow blocks are provided in further increments of one when a single said overflow block is insufficient to store a said record, said records are stored in individual said blocks in the order of their primary keys, said record is inserted by placing it immediately fore of that record with the next-greatest said primary key, and said records aft of the said record inserted are moved further afterwards by no more than is required to accommodate the said inserted records;

and further comprising location control means for the control of locations in said memory device of said primary blocks by said location table;

whereby target data is retrieved by a binary search of said location tables with said primary keys, said target data being retrieved by identification of the block including a target key value and retrieval of said record in that block.

4. An information and retrieval system for computers, comprising:

a facility for using alternate-key blocks capable of storing in an order of values of alternate keys of said alternate-key blocks multiple entries comprising a number of the block in which the alternate key and the corresponding alternate-key value are stored and a primary key of that corresponding record, space for said alternate-key blocks being secured contiguously in advance in identical sizes in a quantity required;

storage means for storage of entries of one or more alternate-key tables in an order of their alternate keys in said alternate-key blocks;

means for addition of alternate-key overflow blocks to said alternate-key blocks for storage of entries when a number of entries having identical said alternate keys increases greatly or when such entries can not be stored in a said alternate-key block due to insertion of an alternate key;

pre-alternate key blocks having a structure identical to said alternate-key blocks in one or more layers when the original number of records is fewer than the final number of said records scheduled for storage; and search and retrieval means wherein target data is retrieved by a binary search of said alternate-key blocks with said alternate keys, the target data being retrieved by retrieval of an entry that includes the target alternate-key value, and identifying from that entry the number of the block containing the target records and accessing that physical block and retrieving the record matching the primary key in the entry in that block.

* * * * *

UNITED STATES PATENT AND TRADEMARK OFFICE
CERTIFICATE OF CORRECTION

PATENT NO. : 6,584,555 B2
DATED : June 24, 2003
INVENTOR(S) : Masaharu Tamatsu

It is certified that error appears in the above-identified patent and that said Letters Patent is hereby corrected as shown below:

<u>Title page,</u>
Item [73], Assignee, should read as follows:
-- Masaharu Tamatsu, Toyko, Japan --

Signed and Sealed this

Sixth Day of July, 2004

JON W. DUDAS
*Acting Director of the United States Patent and Trademark Office*